US010637907B2

(12) United States Patent
Kumar (10) Patent No.: US 10,637,907 B2
(45) Date of Patent: *Apr. 28, 2020

(54) INPUT DEVICES IN HIGH LATENCY NETWORKS

(71) Applicant: CITRIX SYSTEMS, INC., Fort Lauderdale, FL (US)

(72) Inventor: Sandeep Kumar, Fort Lauderdale, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 74 days.

This patent is subject to a terminal disclaimer.

(21) Appl. No.: 15/788,952

(22) Filed: Oct. 20, 2017

(65) Prior Publication Data

US 2018/0041565 A1    Feb. 8, 2018

Related U.S. Application Data

(63) Continuation of application No. 14/923,098, filed on Oct. 26, 2015, now Pat. No. 9,826,019.

(60) Provisional application No. 62/069,175, filed on Oct. 27, 2014.

(51) Int. Cl.
*H04L 29/08* (2006.01)
*H04L 12/26* (2006.01)
(Continued)

(52) U.S. Cl.
CPC .......... *H04L 67/025* (2013.01); *H04L 43/062* (2013.01); *H04L 43/0852* (2013.01);
(Continued)

(58) Field of Classification Search
CPC .. G06F 11/1076; G06F 12/0246; G06F 3/064; G06F 3/0665; G06F 3/0608;
(Continued)

(56) References Cited

U.S. PATENT DOCUMENTS 6,012,110 A    1/2000   Olson et al.
6,370,125 B1   4/2002   Belk
(Continued)

FOREIGN PATENT DOCUMENTS

WO    WO 01/22690       3/2001
WO    WO 2010/008250   1/2010

OTHER PUBLICATIONS

Ruibing Lu, Cheng-Kok Koh, Performance Optimization of Latency Insensitive Systems Through Buffer Queue Sizing of Communication Channels, Nov. 2003, Proceedings of the 2003 IEEE/ACM international conference on Computer-aided design , p. 227 (Year: 2003).*

*Primary Examiner* — Djenane M Bayard
(74) *Attorney, Agent, or Firm* — Allen, Dyer, Doppelt + Gilchrist, PA (57) ABSTRACT

A first computing device for interacting with an input device across a network includes a processor to run an executable capable of accepting device data, provide a data buffer queue size to a second computing device coupled to the network, and request the device data from the second computing device. The amount of data requested is less than or equal to the data buffer queue size. The device data is received from the second computing device to be provided to the executable.

20 Claims, 6 Drawing Sheets

(51) Int. Cl.
*H04L 12/875* (2013.01)
*H04L 12/801* (2013.01)

(52) U.S. Cl.
CPC .............. *H04L 47/10* (2013.01); *H04L 47/56* (2013.01); *H04L 67/10* (2013.01)

(58) Field of Classification Search
CPC .... G06F 3/0619; G06F 3/065; G06F 11/1088; G06F 12/0866; G06F 2003/0697; G06F 3/0601; G06F 17/28; G06F 3/061; G06F 3/0676; G06F 3/0688; G06F 13/102; G06F 2212/1024; G06F 2212/7204; G06F 2212/7208; G06F 3/0631; G06F 3/067; G06F 11/1446; G06F 16/95; G06F 16/957; G06F 2206/1008; G06F 2212/601; G06F 3/0656; G06F 3/068; G06F 8/35; G06F 8/38; G06F 13/161; G06F 3/0659; G06F 2213/0064; H04L 47/56; H04L 43/0852; H04L 49/90; H04L 1/0018
See application file for complete search history.

(56) References Cited

U.S. PATENT DOCUMENTS

| | | |
|---|---|---|
| 6,397,287 B1 | 5/2002 | Brown et al. |
| 6,438,604 B1 | 8/2002 | Kuver et al. |
| 7,099,820 B1 | 8/2006 | Huart et al. |
| 8,787,163 B1 | 7/2014 | Nemavat et al. |
| 9,009,439 B2 * | 4/2015 | Schreter .............. G06F 3/0674 711/171 |
| 2002/0036981 A1 | 3/2002 | Park |
| 2005/0002411 A1 | 1/2005 | Moataghed |
| 2005/0223133 A1 * | 10/2005 | Sen .................. H04L 49/90 710/22 |
| 2006/0184698 A1 | 8/2006 | Conley et al. |
| 2006/0277303 A1 * | 12/2006 | Hegde ............... H04L 67/1008 709/226 |
| 2010/0332401 A1 | 12/2010 | Prahlad et al. |
| 2011/0246688 A1 * | 10/2011 | Vaz .................... G06F 13/1642 710/54 |
| 2012/0158988 A1 * | 6/2012 | Fatehpuria .......... H04L 65/4084 709/234 |
| 2013/0129068 A1 | 5/2013 | Lawson et al. |
| 2014/0233583 A1 | 8/2014 | Tamir et al. |

* cited by examiner

INPUT DEVICES IN HIGH LATENCY NETWORKS

RELATED APPLICATIONS

This application is a continuation of Ser. No. 14/923,098 filed Oct. 26, 2015 which claims the benefit of U.S. Provisional Patent Application No. 62/069,175, filed Oct. 27, 2014, which are incorporated herein in their entirety by reference.

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

Additionally, virtualization technologies can provide remote access to computer resources across public or private networks. Users can use a variety of clients to access a virtual desktop or applications running on a host computer in the virtualized environment. These clients can be directly connected to the host computer or they can connect to the virtualized environment through a public or private network. The client can capture user input and transfer it across the network to the host computer's virtual environment. The application can then provide a response to the client providing an experience similar to if the user were interacting directly with the application.

For some types of user input devices, such as those connected through a USB interface, the application is responsible for periodically requesting updated input device data from the input device. The application will read the input device data, wait a polling period specified by the input device, and then read more input device data. These types of user input devices can store the most recently provided data. When new data is provided, the input device must overwrite existing data. By adjusting their polling frequency to the frequency at which the input device provides data, applications can read the device data after it is updated and before the device provides new data ensuring that all data from the input device is captured by the application.

The use of virtualization in combination with remote clients can introduce a public or private network into the communication path between the application and the user input device connected to the client. In a virtual platform, the application runs on the host server while the user input device is connected to the remote client. The host server can send a request to the remote client to capture the input device data, and the client can respond sending the current input device data to the host application. In this type of environment, the host application is responsible for the frequency of requests sent to the client. The host will only request additional input device data after receiving a response from the client, and the client will only send the current device data when the client receives the request from the host.

As data travels through a network, various factors can cause a delay between the time the data is sent and the time the data is received. This delay is referred to as network latency. In networks with very low network latency, the request and response cycle usually occurs without any interruption in user experience because the entire cycle occurs faster than the polling frequency of the client. As network latency increases and requests for data stop reaching the client before new input device data is provided, the new input device data replaces the existing input device data before the client can send the existing input device data to the host. The data that is overwritten is lost. This data loss can significantly degrade the user experience.

SUMMARY

A first computing device for interacting with an input device across a network includes a processor configured to run an executable capable of accepting device data, provide a data buffer queue size to a second computing device coupled to the network, and request the device data from the second computing device. The amount of data requested may be less than or equal to the data buffer queue size. The device data may be received from the second computing device to be provided to the executable.

The processor may be further configured to receive device polling information from the second computing device, determine a latency in the network, and determine the data buffer queue size using the determined latency and the acquired device polling information.

The processor may be further configured to adjust a first frequency of requests for the device data based on determining a second frequency at which the device data is provided to the executable, determining a subsequent latency in the network, and adjusting the first frequency of requests for the device data using the subsequent determined latency and determined second frequency.

The processor may be further configured to update the data buffer queue size based on determining a subsequent latency in a network, updating the data buffer queue size using the subsequent determined latency and the polling information, and providing the updated data buffer queue size to the second computing device.

The processor may be further configured to create a data buffer queue having at least the size of the data buffer queue size, store the device data in the data buffer queue, and provide the device data to the executable from the data buffer queue.

Yet another aspect is directed to a first computing device for providing device data across a network, and comprising a processor configured to acquire receive a data buffer queue size from a second computing device coupled to the network, create a data buffer queue having at least the size of the data buffer queue size, and receive the device data from an input device. The device data may be stored in the data buffer queue. At least one request may be received for device data from the second computing device. At least a portion of the stored device data may be provided to the second computing device.

The processor may be further configured to acquire device polling information from the input device, provide the device polling information to the second computing device, and determine the data buffer queue size using the device polling information.

The processor may be further configured to acquire an updated data buffer queue size from the second computing device, and resize the data buffer queue to the updated data buffer queue size.

Another aspect is directed to a method for operating a first computing device for interacting with an input device across a network, and comprising running an executable capable of accepting device data, providing a data buffer queue size to a second computing device coupled to the network, and requesting the device data from the second computing device. The amount of data requested may be less than or equal to the data buffer queue size. The device data may be received from the second computing device to be provided to the executable.

Yet another aspect is directed to a method for operating a first computing device for providing device data across a network, and comprising acquiring a data buffer queue size from a second computing device coupled to the network, creating a data buffer queue having at least the size of the data buffer queue size, and receiving device data from an input device. The device data may be stored in the data buffer queue. At least one request for device data may be received from the second computing device. At least a portion of the stored device data is provided to the second computing device.

Another aspect is directed to a non-transitory computer readable storage medium for a first computing device to interact with an input device across a network, with the non-transitory computer readable medium having a plurality of computer executable instructions for causing the first computing device to run an executable capable of accepting device data, provide a data buffer queue size to a second computing device coupled to the network, request the device data from the second computing device, with the amount of data requested being less than or equal to the data buffer queue size, and receive the device data from the second computing device to be provided to the executable.

Yet another aspect is directed to a non-transitory computer readable storage medium storing instructions for a first computing device to provide device data across a network, with the non-transitory computer readable medium having a plurality of computer executable instructions for causing the first computing device to perform steps comprising acquiring a data buffer queue size from a second computing device coupled to the network, creating a data buffer queue having at least the size of the data buffer queue size, receiving device data from an input device, storing the device data in the data buffer queue, receiving at least one request for device data from the second computing device, and providing at least a portion of the stored device data to the second computing device.

BRIEF DESCRIPTION OF THE DRAWINGS

Reference will now be made to the accompanying drawings showing example embodiments. In the drawings.

DETAILED DESCRIPTION

Many modifications and other embodiments will come to the mind of one skilled in the art having the benefit of the teachings presented in the foregoing descriptions and the associated drawings. Therefore, it is understood that the detailed description is not to be limited to the specific embodiments as described herein, and that modifications and embodiments are intended to be included within the scope of the appended claims.

Reference will now be made in detail to the embodiments implemented as described herein, the examples of which are illustrated in the accompanying drawings. Wherever possible, the same reference numbers will be used throughout the drawings to refer to the same or like parts.

The embodiments described herein provide technologies for enhancing the usability of input devices in computing environments operating across high latency networks. The technologies described herein can support a variety of input device types and systems. The technologies described herein can improve the fluidity of the user experience when operating input devices in a computing environment operating across a network. The technologies described herein can provide a consistent flow of input device data across a high latency network to a running application. Furthermore, the technologies described herein can eliminate or reduce the difficulty of using input devices across high latency networks. The technologies described herein can prevent the loss of device data caused by high network latency. The technologies described herein can adapt to changing network conditions.

A first computing device is described herein for interacting with an input device across a network. The first computing device includes one or more processors configured to run an executable requiring device data. The processors are further configured to receive device polling information from a second computing device, determine a latency in a network, determine a data buffer queue size using the determined latency and the device polling information, and provide the data buffer queue size to the second computing device. The processors are also configured to systematically request device data from the second computing device wherein the amount of data requested is less than or equal to the data buffer queue size, receive device data from the second computing device, and systematically provide the device data to the executable.

A second computing device is included for providing device data across a network. The second computing device includes an input device and one or more processors configured to receive polling information from an input device, provide the device polling information to a second computing device, receive a data buffer queue size from the second computing device, wherein the data buffer queue size is determined using the device polling information, and create a data buffer queue having at least the size of the data buffer queue size. The processors are further configured to systematically read device data from the input device based on the device polling information, store the device data in the data buffer queue, receive one or more requests for device data from the second computing device, and provide at least a portion of the stored device data to the second computing device.

Figure 1:
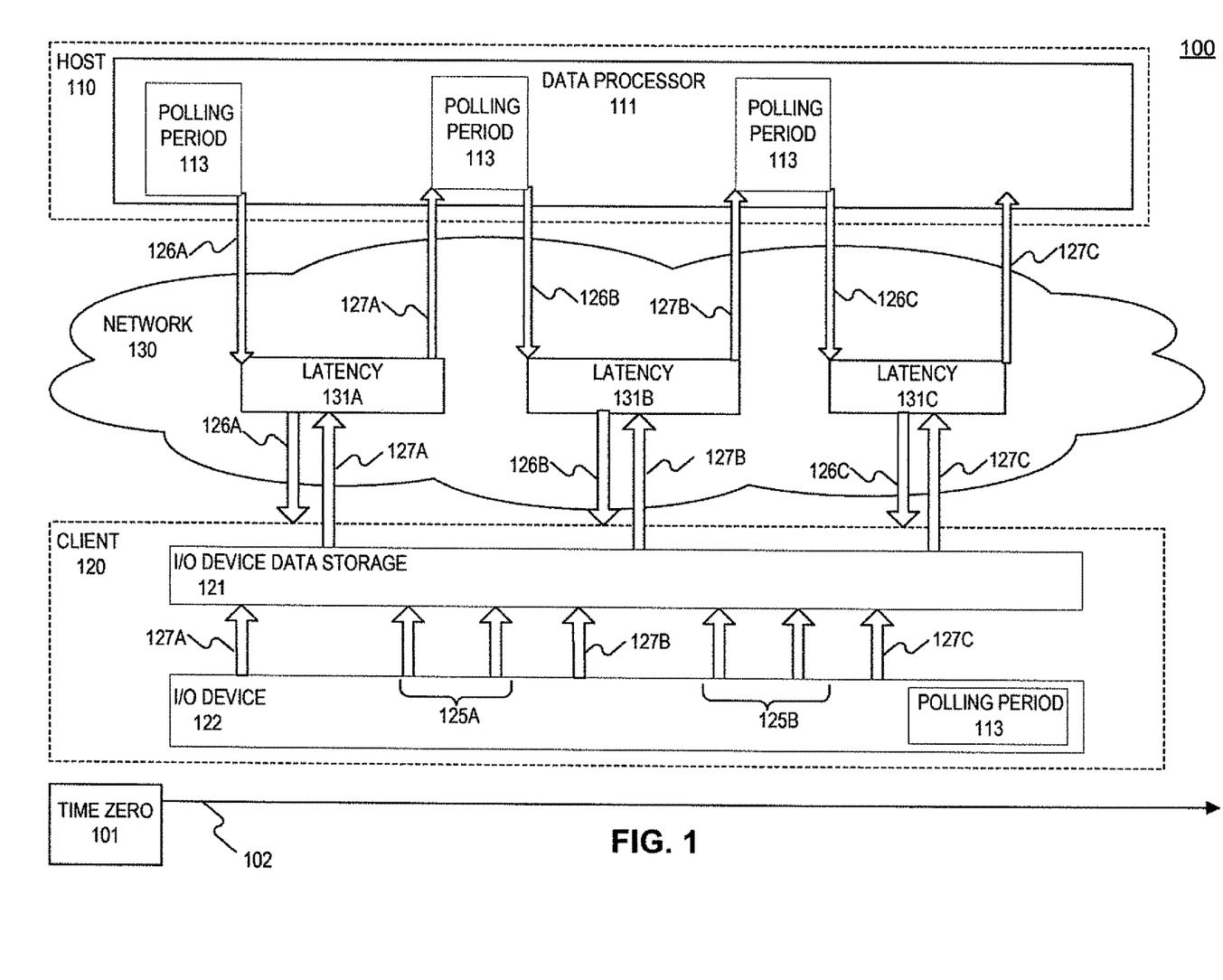
FIG. 1 is a block diagram illustrating a communication process demonstrating problems associated with sending device data over a high latency network.

FIG. 1 is a block diagram illustrating a communication process 100 associated with sending device data over a high latency network 130. Communication process 100 illustrates example communications over time 102 beginning at time zero 101. Communication process 100 includes a client 120 and a host 110 communicating over network 130 using existing technologies. While communication process 100 is directed towards a single client and host, it is appreciated that communication process 100 can include one or more clients and one or more hosts.

Client 120 can include an input/output ("I/O") device 122 and I/O device data storage 121. I/O device 122 can be a standalone device that can be connected to client 120. After being connected to client 120, I/O device 122 can generate or provide new data and store this data in I/O device data storage 121, which can be a standalone storage device or can be a portion of client storage. I/O device data storage 121 stores the most recent data provided by I/O device 122. Each time I/O device 122 provides new data, I/O device 122 can overwrite the existing data in I/O device data storage 121.

I/O device 122 can also contain a polling period 113. Polling period 113 can specify how frequently I/O device 122 provides new data. I/O device 122 provides new data once during each polling period.

After I/O device 122 is connected to client 120, client 120 can send information about I/O device 122 to host 110. This information can include device polling period 113.

Client 120 can receive host requests for data 126 (e.g., requests 126A-C) from host 110 and can provide data samples 127 (e.g., data samples 127A-C) to host 110. I/O data samples 127 represents data provided by I/O device 122 that is stored in I/O device data storage 121 and eventually sent to host 110 in response to a host request for data 126. For example, after receiving request for data 126A from host 110, client 120 can read I/O device data storage 121, retrieve the most recently stored I/O data sample 127A, and send I/O data sample 127A to host 110. I/O device 122 can also provide data that is stored in I/O device data storage but is never sent to host 110. This data becomes lost I/O data samples 125.

Host 110 can include a data processor 111. Data processor 111 can receive information from client 120 about I/O device 122. This information can include polling period 113. Data processor 111 can send host requests 126 to client 120 based on polling period 113. In response to host requests 126, data processor 111 can receive I/O data samples 127 from client 120. After receiving I/O data samples 127, data processor 111 waits for a time equal to or greater than device polling period 113 before sending a new host request 126 to client 120 for additional device data.

Network 130 is an example high latency network. Latency 131A-C illustrates time delay occurring in the network. Latency 131A-C represents delay in the round trip transmission of data between host 110 and client 120. Because of latency 131A-C, host request for data 126A-C and I/O data samples 127A-C can be delayed in transmission through network 130.

Example communication process 100 begins at time zero 101 and progress over time 102. As time progresses, data processor 111 can generate an initial host request for data 126A. Host request for data 126A can travel through network 130, can be delayed by network latency 131A before reaching client 120. Client 120 can respond to the request by accessing I/O device data storage 121, retrieving the most recent I/O data sample 127A provided by I/O device 122 and stored in I/O device data storage 121, and sending I/O data sample 127A to host. In transit, network latency 131A delays I/O data sample 127A. Eventually, I/O data sample 127A can reach data processor 111. Data processor 111 can wait the specified polling period and initiate host request 126B, which can be delayed by network latency 131B. Host request 126B can reach client after the delay caused by network latency 131B. Because network latency 131A and 131B combine to cause the time between client 120 sending I/O data sample 127A and client receiving host request for data 126B to be greater than polling period 113, I/O device can provide multiple I/O data samples 125A while client 120 waits host request for data 126B from host 110. By the time host request for data 126B reaches client 120, client could have overwritten I/O data samples 125A leaving the most recently provided I/O data sample 127B. Thus I/O data samples 125A are lost and never sent to host 110. The cycle can repeat, leading to more and more lost I/O data samples 125B. As I/O data samples are lost, the user experience significantly degrades. The embodiments described herein provide a more fluid experience for users of clients operating in high latency networks.

Figure 2:
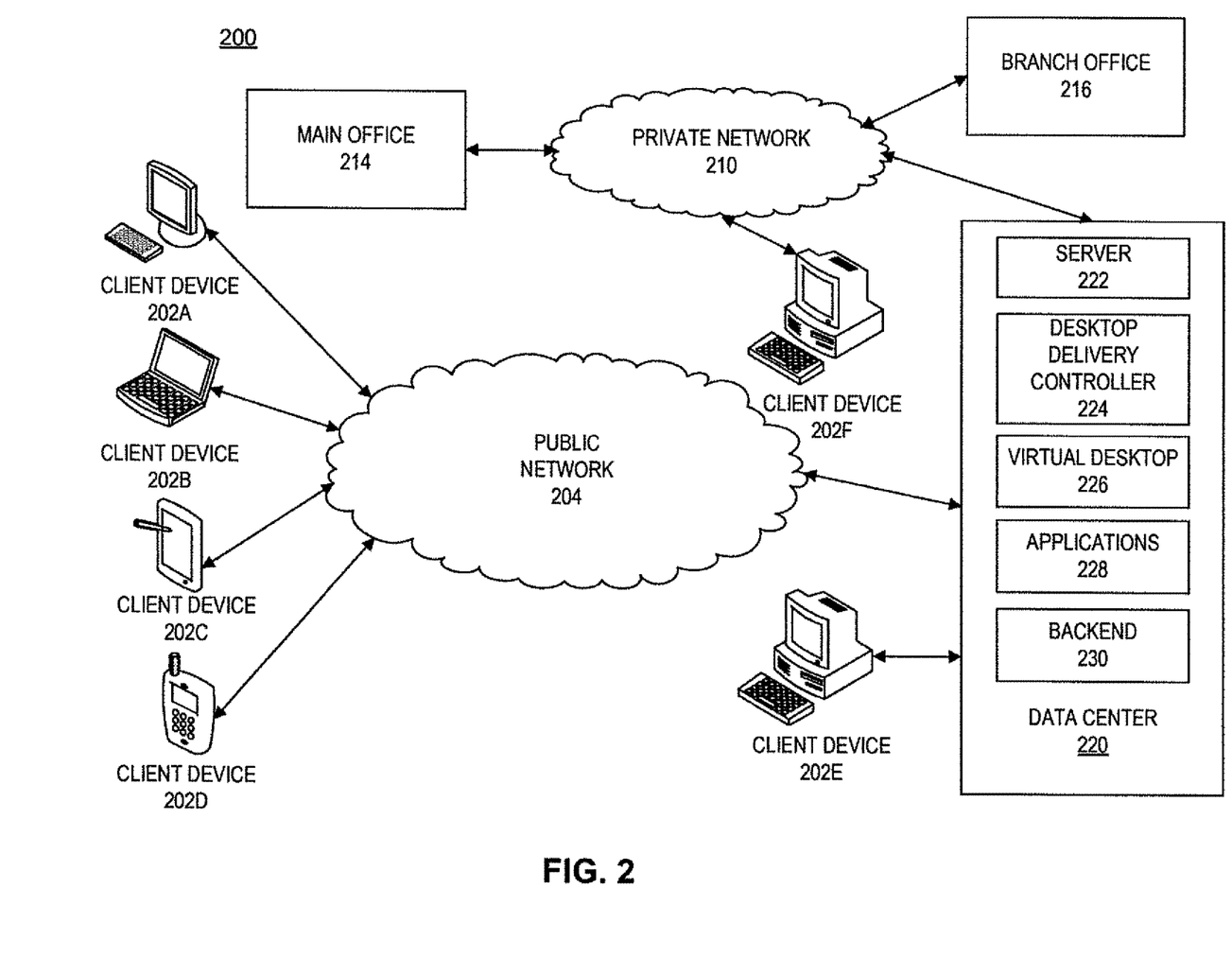
FIG. 2 is a block diagram of a network environment, consistent with embodiments as described herein.

FIG. 2 is a block diagram of a network environment 200. While network environment 200 is directed to a virtual network environment, it is appreciated that the network environment can be any type of network that communicates using packets. Network environment 200 can include one or more client devices 202A-F, a public network 204, a private network 210, a main office 214, a branch office 216, and a data center 220.

One or more client devices 202A-F (collectively as 202) are devices that can acquire remote services from data center 220 through various means. Client devices 202A-F can communicate with data center 220 either directly (e.g., client device 202E) or indirectly through a public network 204 (e.g., client devices 202A-D) or a private network 210 (e.g., client device 202F). In some embodiments, a main office 214 and a branch office 216 can also include one or more client devices that are similar to client devices 202A-F. Main office 214 can be located, for example, in a principal place of business of a company. Branch office 216 can be located, for example, remote to main office 214. In some embodiments, the client devices of main office 214 and branch office 216 can also acquire remote services from data center 220 through, for example, private network 210.

When client device 202 communicates through public network 204 or private network 210, a communication link can be established. For example, a communication link can be established by public network 204, thereby providing a client device (e.g. client devices 202A-D) access to data center 220. A communication link can also be established by private network 210, thereby providing client device 202F, main office 214 and/or branch office 216 accesses to data center 220. While client devices 202A-D are portrayed as a computer (e.g., client devices 202A), a laptop (e.g., client device 2023), a tablet (e.g., client device 202C), and a mobile smart phone (e.g., client device 202D), it is appreciated that client device 202 could be any type of device that communicates packets to and from data center 220.

Public network 204 and private network 210 can be any type of network for, example, a wide area network (WAN), a local area network (LAN), or a metropolitan area network (MAN). As an example, a WAN can be the Internet or the World Wide Web, and a LAN can be a corporate Intranet. Public network 204 and private network 210 can be a wired network, a wireless network, or a combination of both.

Data center 220 can be a central repository, either physical or virtual, for the storage, management, and dissemination of data and information pertaining to a particular public or private entity. Data center 220 can be used to house computer systems and associated components, such as one or physical servers, virtual servers, and storage systems. Data center 220 can include, among other things, one or more servers (e.g., server 222), a desktop delivery controller 224, a virtual desktop 226, applications 228, and a backend system 230.

Server 222 can be an entity represented by an IP address and can exist as a single entity or a member of a server farm. Server 222 can be a physical server or a virtual server. In some embodiments, server 222 can include a hardware layer, an operating system, a communication subsystem, and a hypervisor creating or managing one or more virtual machines. Server 222 can provide one or more services to an endpoint. These services can include providing one or more applications 228 to one or more endpoints (e.g., client devices 202A-F). For example, one or more applications 228 can include Windows™- or SAP™-based applications and computing resources. Via the communication subsystem, server 222 can communicate with other devices (e.g., client devices 202) through various types of networks (e.g., private network 210 and public network 204).

Desktop delivery controller 224 can be a device that enables delivery of services, such as virtual desktops 226 to client devices (e.g., client devices 202A-F). Desktop delivery controller 224 can provide functionality required to manage, maintain, and optimize all virtual desktop communications. In some embodiments, desktop delivery controller 224 can control, manage, maintain, or optimize the provisioning of applications 228.

In some embodiments, one or more virtual desktops 226 can provide one or more applications 228. Virtual desktops 226 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 228), or a combination thereof.

Backend system 230 can be a single or multiple instances of computer networking hardware, appliances, or servers in a server farm or a bank of servers. Backend system 230 can interface directly or indirectly with server 222. For example, backend system 230 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 230 can also include, among other things, an Oracle backend server, a SQL Server backend, and/or a dynamic host configuration protocol (DHCP) server. Backend system 230 can provide data, services, or a combination of both to data center 220, which can then provide that information via varying forms to client devices 202 or branch office 240.

Figure 3A:
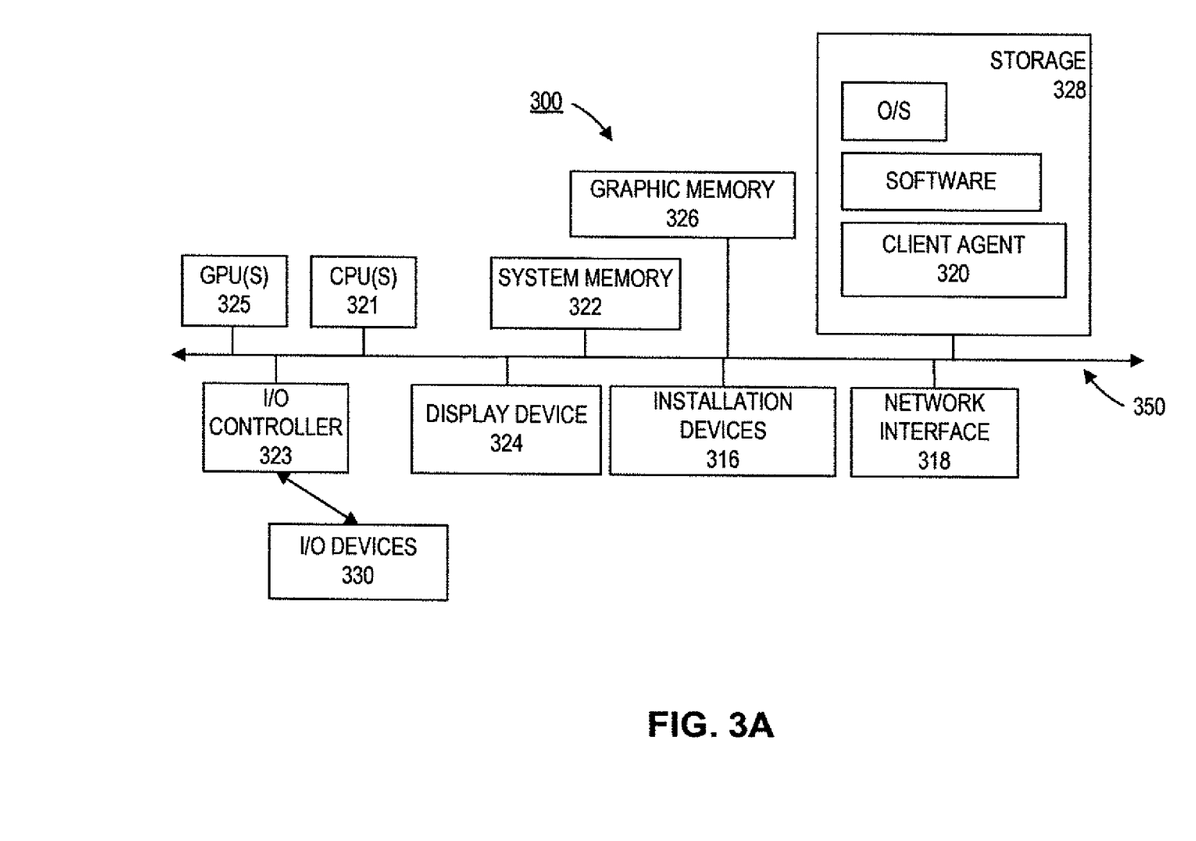
FIGS. 3A-3B are block diagrams of a computing device, consistent with embodiments as described herein.
Figure 3B:
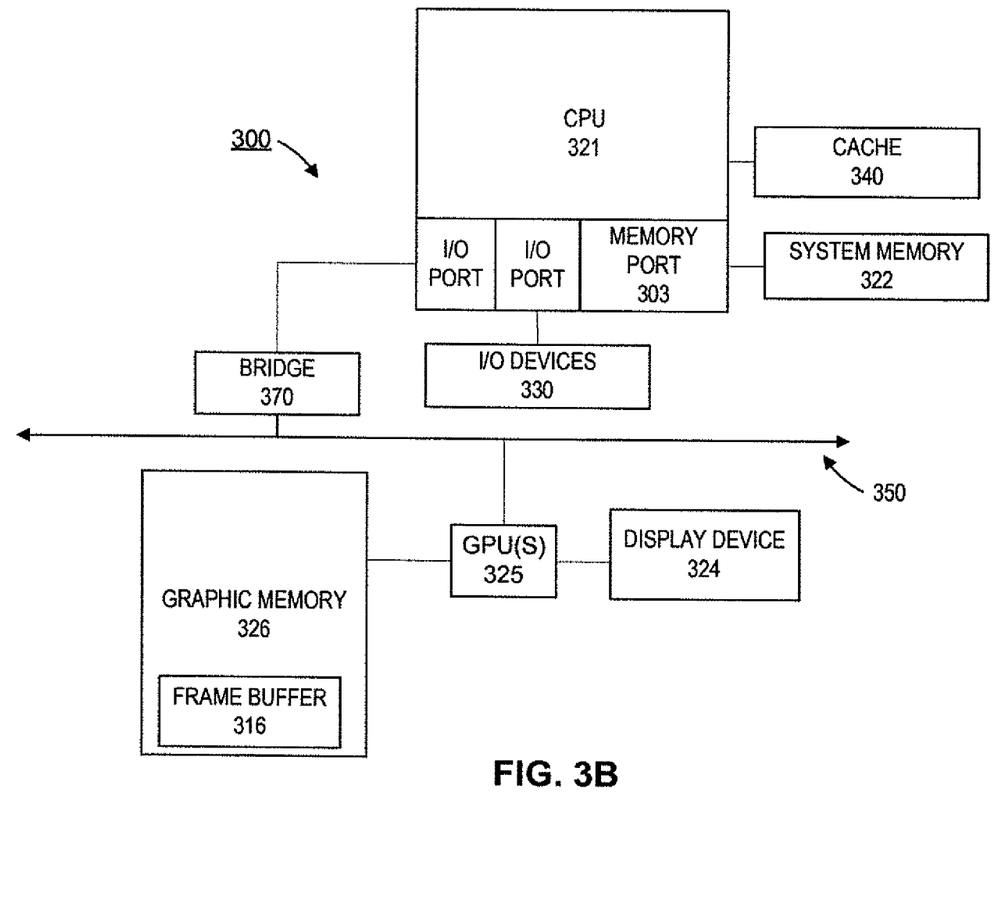

FIGS. 3A-3B are block diagrams of a computing device 300, consistent with embodiments as described herein. It is appreciated that computing device 300 can be an example of client device 202. As shown in FIG. 3A, each computing device 300 can include one or more central processing units (CPUs) 321, one or more graphics processing units (GPUs 325), a system memory 322, and a graphic memory 326. CPUs 321 can be any logic circuitry that responds to and processes instructions fetched from the system memory 322. CPUs 321 can be a single or multiple microprocessors, field-programmable gate arrays (FPGAs), or digital signal processors (DSPs) capable of executing particular sets of instructions stored in a memory (e.g., system memory 322) or a cache (e.g., cache 340). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a cache, a register, or a semiconductor memory. System memory 322 can be one or more memory chips capable of storing data and allowing any storage location to be directly accessed by CPUs 321. System memory 322 can be any type of random access memory (RAM), or any other available memory chip capable of operating as described herein. In the embodiment shown in FIG. 3A, CPUs 321 can communicate with system memory 322 via a system interface 350.

GPUs 325 can be any type of specialized circuitry that can manipulate and alter memory (e.g., graphic memory 326) to provide and/or accelerate the creation of images stored in a frame buffer (e.g., frame buffer 316 shown in FIG. 3B) for output to a display device (e.g., display device 324). GPUs 325 can have a highly parallel structure making them more effective than general-purpose CPUs 321 for algorithms where processing of large blocks of graphical data can be performed in parallel. Furthermore, the functionality of GPUs 325 can also be included in a chipset of in some other type of special purpose processing unit or co-processor.

CPUs 321 can connect to system memory 322 and system interface 350. CPUs 321 can execute programming instructions stored in the system memory 322, operates on data stored in system memory 322 and communicates with the GPUs 325 through the system interface 350, which bridges communication between the CPUs 321 and GPUs 325. In some embodiments, CPUs 321, GPUs 325, system interface 350, or any combination thereof, can be integrated into a single processing unit. GPUs 325 can be capable of executing particular sets of instructions stored in system memory 322 to manipulate graphical data store in system memory 322 or graphic memory 326. For example, GPUs 325 can receive instructions transmitted by the CPUs 321 and processes the instructions in order to render graphics data stored in the graphic memory 326. Graphic memory 326 can be any memory space accessible by GPUs 325, including local memory, system memory, on-chip memories, and hard disk. GPUs 325 can enable displaying of graphical data stored in graphic memory 326 on display device 324.

Computing device 300 can also include display device 324 and an input/output (I/O) device 330 (e.g., a keyboard, mouse, or pointing device) connected through an I/O controller 323, both of which communicate via system interface 350. It is appreciated that CPUs 321 can also communicate with system memory 322 and other devices in manners other than through system interface 350, such as through serial communication manners or point-to-point communication manners. Similarly, GPUs 325 can also communicate with graphic memory 326 and other devices in manners other than system interface 350. Furthermore, I/O device 330 can also provide storage and/or an installation medium for computing device 300.

FIG. 3B depicts an embodiment of a computing device 300 in which CPUs 321 communicates directly with system memory 322 via a memory port 303, and similarly GPUs 325 communicates directly with graphic memory 326. CPUs 321 can communicate with a cache 340 via a secondary bus, sometimes referred to as a backside bus. In some embodiments, CPUs 321 can communicate with cache 340 via system interface 350. Cache 340 typically has a faster response time than system memory 322. In some embodiments, such as the embodiment shown in FIG. 3B, CPUs 321 can communicate directly with I/O device 330 via an I/O port. In further embodiments, I/O device 330 can be a bridge 370 between system interface 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Thunderbolt™ bus, or a Serial Attached small computer system interface bus.

As shown in FIG. 3B, GPUs 325 can also communicate directly with graphic memory 326 and display device 324. GPUs 325 can communicate with CPUs 321 and other devices through system interface 350. Graphic memory 326 can also include a frame buffer 316. Frame buffer 316 can be a graphic output device that drives a display device (e.g., display device 324) from a memory buffer of graphic memory 326 containing a complete frame of graphical data. Frame buffer 316 can store the final graphic frames, which are to be displayed on display device 324.

As shown in FIG. 3A, computing device 300 can support any suitable installation device 316, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 320, or portion thereof. Computing device 300 can further comprise a storage device 328, such as one or more hard disk drives or redundant arrays of independent disks, for storing an operating system and other related software, and for storing application software programs such as any program related to client agent 320. Optionally, any of the installation devices 316 could also be used as storage device 328.

Furthermore, computing device 300 can include a network interface 318 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 318 can comprise a built-in network adapter, network interface card, PCMCIA network card, card bus network adapter, wireless network adapter, USB network adapter, modem or any other device suitable for interfacing computing device 300 to any type of network capable of communication and performing the operations described herein.

Figure 4:
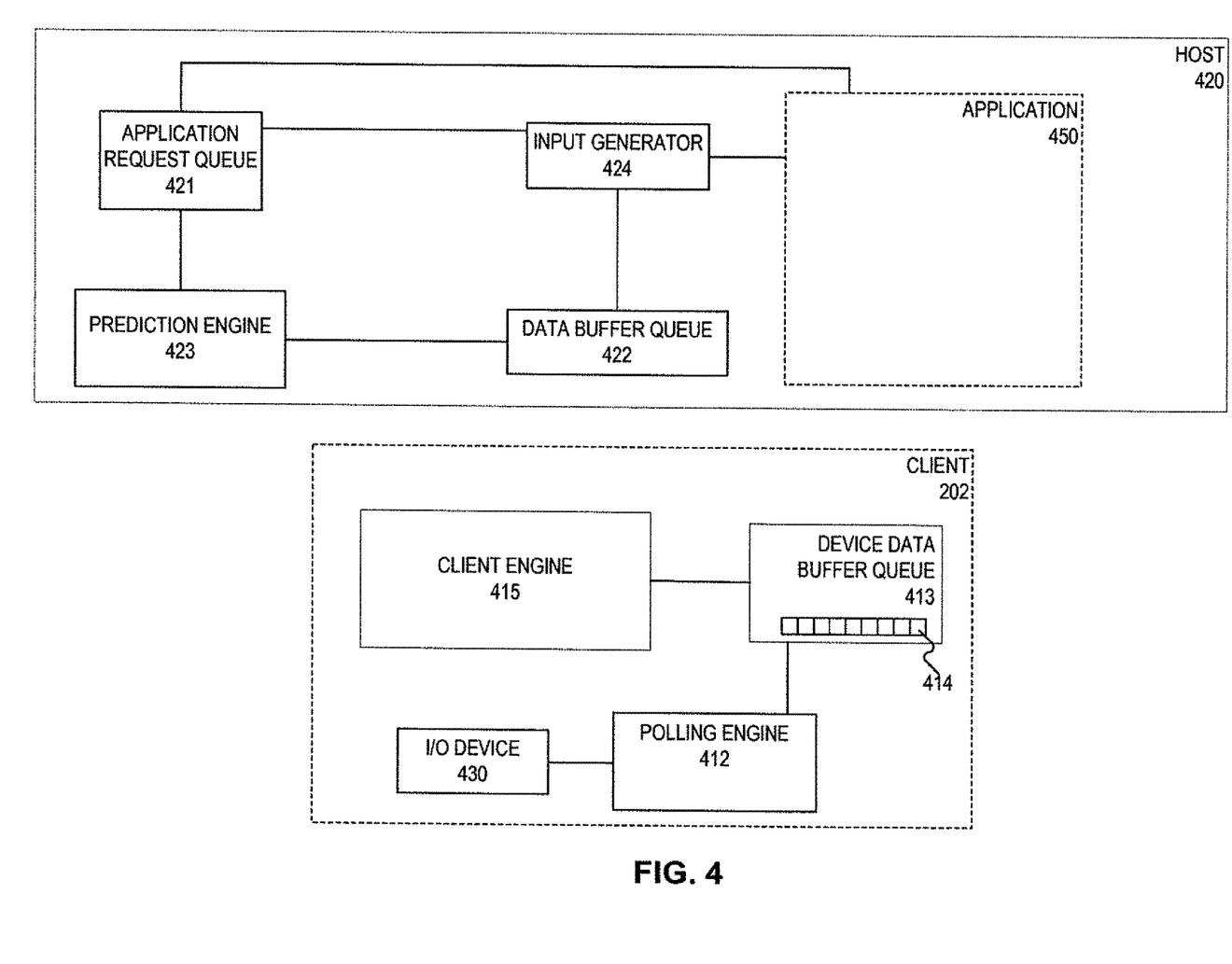
FIG. 4 is a block diagram of a host and client environment, consistent with embodiments as described herein.

FIG. 4 is a block diagram of a client 202 and a host 420, consistent with the embodiments as described herein. Client 202 can be a device, such as computing device 300. Moreover, host 420 can be computing device 300 and can be a service provided by data center 220. In some embodiments, host 420 can be part of a virtual desktop 226, desktop delivery controller 224, applications 228, backend 230, and/or other service provided as part of data center 220. In some embodiments, host 420 and application 450 are combined into one process or service provided by data center 220. In some embodiments, application can include device drivers, modules or other software provided by host 420.

Host 420 can include a data buffer queue 422 and application request queue 421. Data buffer queue 422 can store data from I/O device 430 received from client 202. Application request queue 421 can store requests for data from I/O device 430 initiated by application 450. In host 420, application request queue 421 and data buffer queue 422 can be First-In-First-Out ("FIFO") queues processing data in the order inserted. Application request queue 421 and data buffer queue 422 can be stored in a system memory, such as system memory 322.

In some embodiments, host 420 can contain an input generator 424, which can monitor data buffer queue 422. Input generator 424 can combine I/O device data stored in data buffer queue 422 and pending application requests stored in application request queue 421 to provide I/O device 430 data requested by application 450. In some embodiments, input generator 424 can further monitor data buffer queue 422 and systematically adjust the frequency at which data from I/O device 430 stored in data buffer queue 422 is provided to application 450.

In some embodiments, host 420 can contain a prediction engine 423, which can monitor the size of data buffer queue 422. Prediction engine 423 can also monitor the network latency. Based on these factors, prediction engine 423 can adjust the frequency of requests made to client 202. Additionally, prediction engine 423 can determine the amount of I/O device input data to request from client 202.

In the embodiment shown in FIG. 4, client 202 can contain client engine 415, device data buffer queue 413, containing data buffer 414, polling engine 412, and I/O device 430, which can be a standalone device that is communicatively coupled to client 202. Device data buffer queue 413 and buffer 414 can be stored in a system memory, such as system memory 322. I/O device 430 can be an example device of I/O devices 330. Polling engine 412 can read I/O device data from I/O device 430 at the polling period specified in I/O device 430, and can store I/O device data from I/O device 430 in device data buffer queue 413. In some embodiments, device data buffer queue 413 can be a FIFO data buffer queue storing data in the order received from I/O device 430. Client engine 415 can access the I/O device data stored in buffer 414 through device data buffer queue 413 retrieving the data buffer in the order it was inserted.

Figure 5:
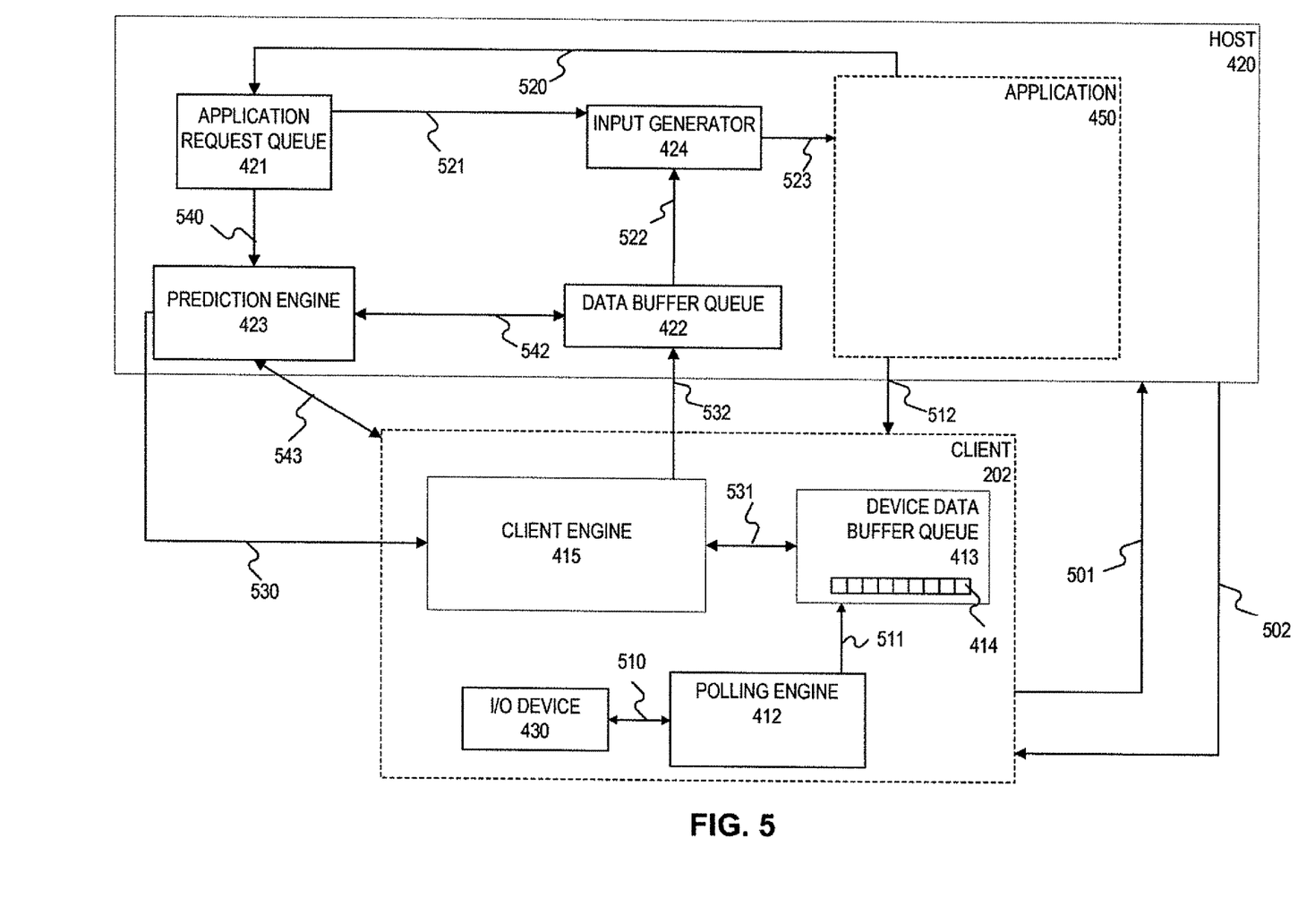
FIG. 5 illustrates a communication flow of the host and client environment of FIG. 4, consistent with embodiments as described herein.

FIG. 5 is a block diagram of host 420 and client 202 communications, consistent with embodiments as described herein. After I/O device 430 connects to or is communicatively coupled to client 202, client 202 can send (501) details of I/O device 430 to host 420 including the polling period associated with I/O device 430. After receiving the I/O device details, host 420 can instruct (502) client 202 to create polling engine 412 configured to poll I/O device 430 at the polling period associated with I/O device 430. Further, host 420 can calculate an I/O device queue size and instruct (502) client 202 to set data buffer queue 414 to the calculated size. In some embodiments, the factors used to calculate the I/O device queue size can include the network latency and the polling period. In some embodiments, the host can base the polling frequency and data buffer queue sizes on external factors. For example, external factors can include a configuration file for host 420, a configuration file for application 450, and/or a manual setting created by an administrator of application 450 or host 420.

After client 202 configures polling engine 412 based on the instructions from host 420, polling engine 412 can poll I/O device 430 for data at the polling period specified by host 420. Polling engine 412 can acquire (510) data from I/O device 430 and send (511) available data to device data buffer queue 413. Device data buffer queue 413 can store the device data in buffer 414 for later use. In some embodiments, device data buffer queue 413 is a FIFO queue preserving the order of data received from polling engine 412. After device data buffer queue 413 stores the I/O device data, client engine can access (531) the I/O device data from device data buffer queue 413.

Application 450 can periodically generate a request (520) for I/O device data. Host 420 can store the request in application request queue 421. The requests stored in application request queue 421 can be processed in the order they are received after data from I/O device 430 becomes available. Input generator 424 can read (521) a request in application request queue, can read (522) the corresponding I/O data received (532) from client 202 and stored in data buffer queue 422, and can combine the request and I/O device data to fulfill (523) the request for data from application 450. If data buffer queue 422 does not contain the necessary data, input generator 424 can wait until I/O device data is received from client 202 and inserted into data buffer queue 422 before continuing. After data becomes available in data buffer queue 422, input generator 424 can process pending requests from application request queue 421 loading I/O device data from data buffer queue 422 in a FIFO order.

Input generator 424 can systematically adjust the frequency at which it provides (523) responses to application 450. In some embodiments, if input generator 424 detects that no additional data is available in buffer queue 422 after fulfilling (523) a request from application 450, input generator 424 can decrease the rate that responses are provided (523) to application 450. In some embodiments, if input generator 424 detects that there is additional data available in buffer queue 422 after fulfilling (523) a request from application 450, input generator 424 can decrease the rate that responses are provided (523) to application 450. In some embodiments, input generator 424 will check the amount of data available in data buffer queue 422 and systematically adjust the frequency after every response 523 to application 450.

Prediction engine 423 can request (530) data from client engine 415. Client engine 415 can access (531) the I/O device data from device data buffer queue 413 and respond by sending (532) the requested I/O device data to host 420. Host 420 can store the response from client engine 415 in buffer queue 422. In some embodiments, if device data buffer queue 414 does not contain enough I/O device data to respond to a request from prediction engine 423, client engine 415 can queue the request until I/O device data becomes available or until host 420 cancels the request.

The frequency at which prediction engine 423 requests I/O device data from client 202 can be systematically determined. In some embodiments, prediction engine 423 can request (530) data from client engine 415 less frequently than application 450 requests (520) data from application request queue 421. In these embodiments, client engine 415 can provide more than one data buffer to host 420. In these embodiments the additional data from client 202 can fill data buffer queue 422 in anticipation of future request for I/O device data (520) from application 450. In some embodiments, prediction engine 423 can request (530) multiple samples of I/O device data from client engine 415 instead of a single sample. By including multiple samples in a single request (530) and response (532) cycle, these embodiments can more efficiently transfer I/O device data from client 202 to host 420, limit network overhead, and limit the effects of network latency.

Prediction engine 423 can monitor (542) properties of data buffer queue 422. In some embodiments these properties include the size and utilization of data buffer queue 422. Prediction engine 423 can also determine network latency. In some embodiments, prediction engine 423 determines latency by calculating the round trip time for a network packet traveling from host 420 to client 202 and back to host 420. In some embodiments, client 202 can set a flag in the response packet header indicating whether the response incurred additional delay due to client 202. In these embodiments, prediction engine 423 can determine if the round trip time is greater than the current network latency due to delays in processing by client 202. Prediction engine 423 can use the properties it monitors to adjust the frequency at which it requests data from client 202 and the amount of data requested in each request (530) and response (532) cycle. Prediction engine 423 recalculates the request frequency and the size of the requested data when application request queue 421 notifies (540) prediction engine 423 that application 450 requested (520) I/O device data. In some embodiments, prediction engine 423 performs this recalculation at an arbitrary interval.

The size of data buffer queue 422, the size of device data buffer queue 413, and the frequency of requests to client 202, can be systematically determined. In some embodiments, prediction engine 423 can adjust the data buffer queue 422 size and the device data buffer queue 413 size to adapt to changing latency in the network. In some embodiments, if data buffer queue 422 receives more I/O device data than prediction engine 423 originally requested from client engine 415, prediction engine 423 can increase the frequency at which it requests (530) data from client, adjust the data buffer queue 422 size, and also instruct (543) client 202 to adjust the size of device data buffer queue 413. In some embodiments, if buffer queue 422, receives less device data than expected, prediction engine 423 can reduce the request frequency to accommodate, decrease the buffer queue 422 size, and instruct (543) client 202 to reduce the device data buffer queue 413 size. In some embodiments, prediction engine 423 periodically recalculates the data buffer queue 422 size and the device data buffer queue 413 size based on the changing properties of the data buffer queue 422 and the network. In some embodiments, prediction engine 423 performs this recalculation when application 450 inserts (520) a new request for I/O device data in request queue 421. In some embodiments, prediction engine 423 performs the recalculation at an arbitrary interval. In some embodiments, prediction engine 423 can adjust either the frequency at which it requests data buffers from client engine 415 or the size of the data buffer queue 422.

In some embodiments, the recalculation of buffer sizes, the adjustments to the frequency of requests for I/O device data sent to client 202, and the frequency of the application responses provided to application 450 can work together to ensure a consistent flow of data to application 450 despite changes in the network latency or other factors. With access to a consistent flow of data, application 450 can consistently process the incoming data and provide a fluid user experience without interruption from lost I/O device data.

In some embodiments, the device configuration can be changed (e.g. by an administrator). When the device configuration changes, host 420 can reset application request queue 421 and buffer queue 422, and client 202 can reset device data buffer queue 413 and its associated buffer 414.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification. It is intended that the specification and examples be considered as examples only. It is also intended that the sequence of steps shown in figures are only for illustrative purposes and are not intended to be limited to any particular sequence of steps. As such, those skilled in the art can appreciate that these steps can be performed in a different order while implementing the same method.

That which is claimed is:

1. A first computing device for interacting with an input device across a network, and comprising at least one processor configured to:
   run an executable capable of accepting device data;
   provide a data buffer queue size to a second computing device coupled to the network, with the data buffer queue size being based on a latency in the network;
   request the device data from the second computing device, with the amount of data requested being less than or equal to the data buffer queue size; and
   receive the device data from the second computing device to be provided to the executable.

2. The first computing device of claim 1 wherein the at least one processor is further configured to:
   receive device polling information from the second computing device;
   determine the latency in the network; and
   determine the data buffer queue size using the determined latency and the received device polling information.

3. The first computing device of claim 2 wherein the at least one processor is further configured to adjust a first frequency of requests for the device data based on the following:
   determine a second frequency at which the device data is provided to the executable;
   determine a subsequent latency in the network; and
   adjust the first frequency of requests for the device data using the subsequent determined latency and determined second frequency.

4. The first computing device of claim 2 wherein the at least one processor is further configured to update the data buffer queue size based on the following:
   determine a subsequent latency in a network;
   update the data buffer queue size using the subsequent determined latency and the polling information; and
   provide the updated data buffer queue size to the second computing device.

5. The first computing device of claim 1 wherein the at least one processor is further configured to:
   create a data buffer queue having at least the size of the data buffer queue size;
   store the device data in the data buffer queue; and
   provide the device data to the executable from the data buffer queue.

6. A first computing device for providing device data across a network, and comprising at least one processor configured to:
   receive a data buffer queue size from a second computing device coupled to the network, with the data buffer queue size being based on device polling information of the first computing device;
   create a data buffer queue having at least the size of the data buffer queue size;
   receive the device data from an input device;
   store the device data in the data buffer queue;
   receive at least one request for the device data from the second computing device; and
   provide at least a portion of the stored device data to the second computing device.

7. The first computing device of claim 6 wherein the at least one processor is further configured to:
   receive the device polling information from the input device; and
   provide the device polling information to the second computing device, with the second computing device using the device polling information to determine the data buffer queue size.

8. The first computing device of claim 6 wherein the at least one processor is further configured to:
   receive an updated data buffer queue size from the second computing device; and
   resize the data buffer queue to the updated data buffer queue size.

9. A method for operating a first computing device for interacting with an input device across a network, and comprising:
   running an executable capable of accepting device data;
   providing a data buffer queue size to a second computing device coupled to the network, with the data buffer queue size being based on a latency in the network;
   requesting the device data from the second computing device, with the amount of data requested being less than or equal to the data buffer queue size; and
   receiving the device data from the second computing device to be provided to the executable.

10. The method of claim 9 further comprising:
    receiving device polling information from the second computing device;
    determining the latency in the network; and
    determining the data buffer queue size using the determined latency and the received device polling information.

11. The method of claim 10 further comprising adjusting a first frequency of requests for the device data based on the following:
    determining a second frequency at which the device data is provided to the executable;
    determining a subsequent latency in the network; and
    adjusting the first frequency of requests for device data using the subsequent determined latency and determined second frequency.

12. The method of claim 10 further comprising updating the data buffer queue size based on the following:
    determining a subsequent latency in a network;
    updating the data buffer queue size using the subsequent determined latency and the polling information; and
    providing the updated data buffer queue size to the second computing device.

13. The method of claim 9 further comprising:
    creating a data buffer queue having at least the size of the data buffer queue size;
    storing the device data in the data buffer queue; and
    providing the device data to the executable from the data buffer queue.

14. A method for operating a first computing device for providing device data across a network, and comprising:
    receiving a data buffer queue size from a second computing device coupled to the network, with the data buffer queue size being based on device polling information of the first computing device;
    creating a data buffer queue having at least the size of the data buffer queue size;
    receiving the device data from an input device;
    storing the device data in the data buffer queue;
    receiving at least one request for the device data from the second computing device; and
    providing at least a portion of the stored device data to the second computing device.

15. The method of claim 14 further comprising:
receiving the device polling information from the input device; and
providing the device polling information to the second computing device, with the second computing device using the device polling information to determine the data buffer queue size.

16. The method of claim 14 further comprising:
receiving an updated data buffer queue size from the second computing device; and
resizing the data buffer queue to the updated data buffer queue size.

17. A method for operating a first computing device for interacting with an input device across a network, and comprising:
running an executable capable of accepting device data;
providing a data buffer queue size to a second computing device coupled to the network, with the data buffer queue size being based on device polling information of the second computing device;
requesting the device data from the second computing device, with the amount of data requested being less than or equal to the data buffer queue size; and
receiving the device data from the second computing device to be provided to the executable.

18. The method of claim 17 further comprising:
receiving the device polling information from the second computing device;
determining a latency in the network; and
determining the data buffer queue size using the determined latency and the received device polling information.

19. A method for operating a first computing device for providing device data across a network, and comprising:
receiving a data buffer queue size from a second computing device coupled to the network, with the data buffer queue size being based on a latency in the network;
creating a data buffer queue having at least the size of the data buffer queue size;
receiving the device data from an input device;
storing the device data in the data buffer queue;
receiving at least one request for the device data from the second computing device; and
providing at least a portion of the stored device data to the second computing device.

20. The method of claim 19 further comprising:
receiving the device polling information from the input device; and
providing the device polling information to the second computing device, with the second computing device using the device polling information and the latency in the network to determine the data buffer queue size.

* * * * *